Patented May 5, 1931

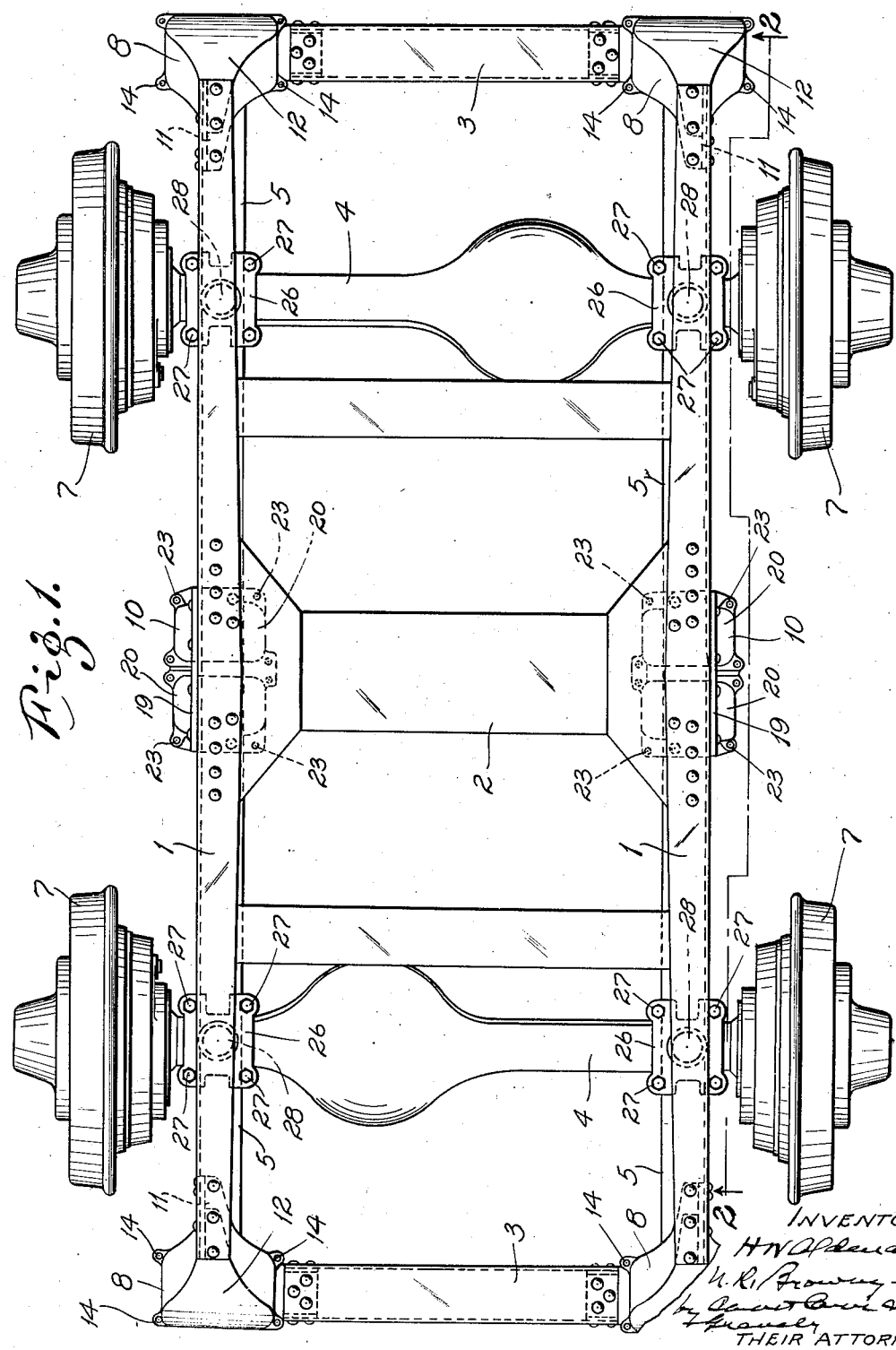

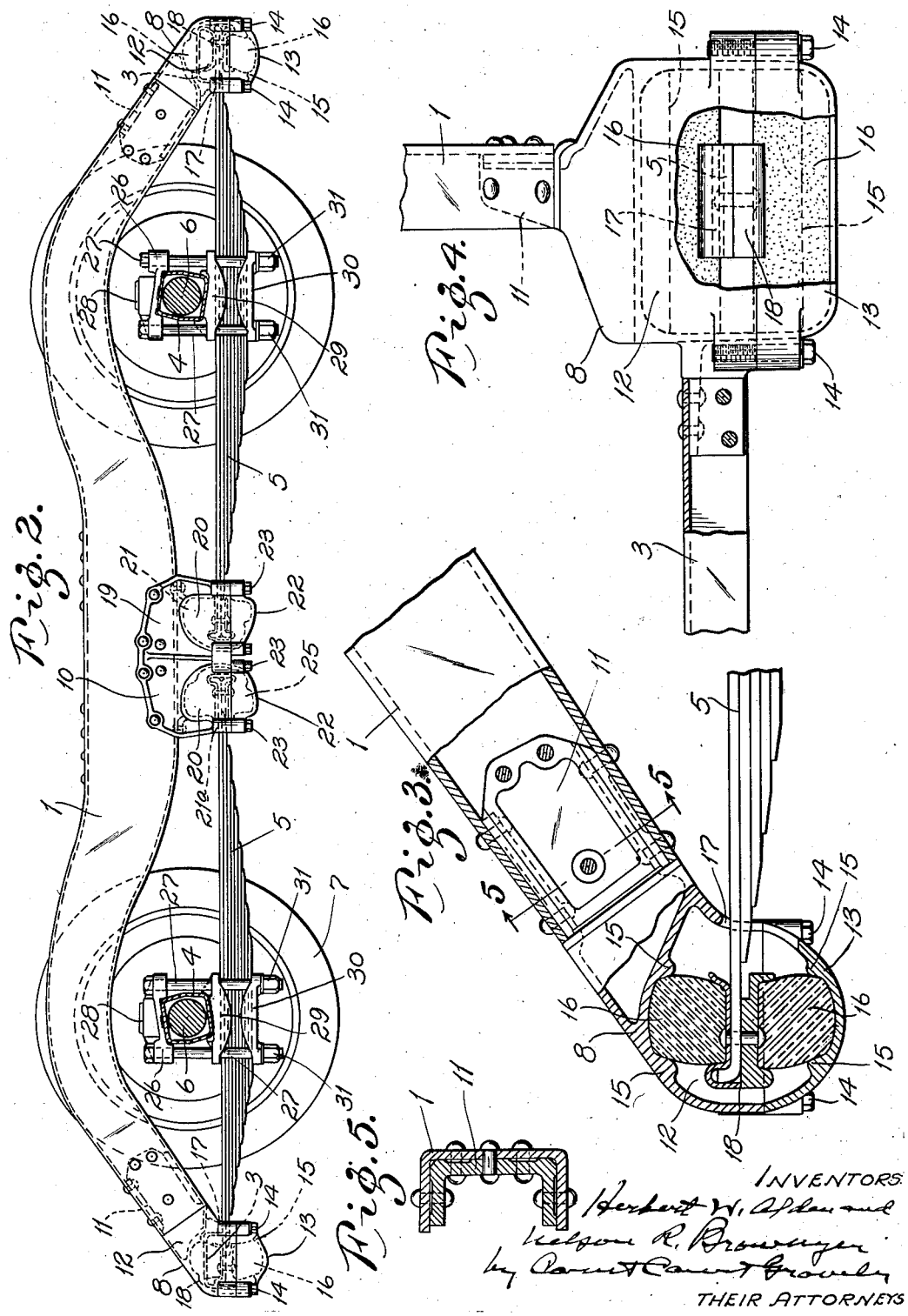

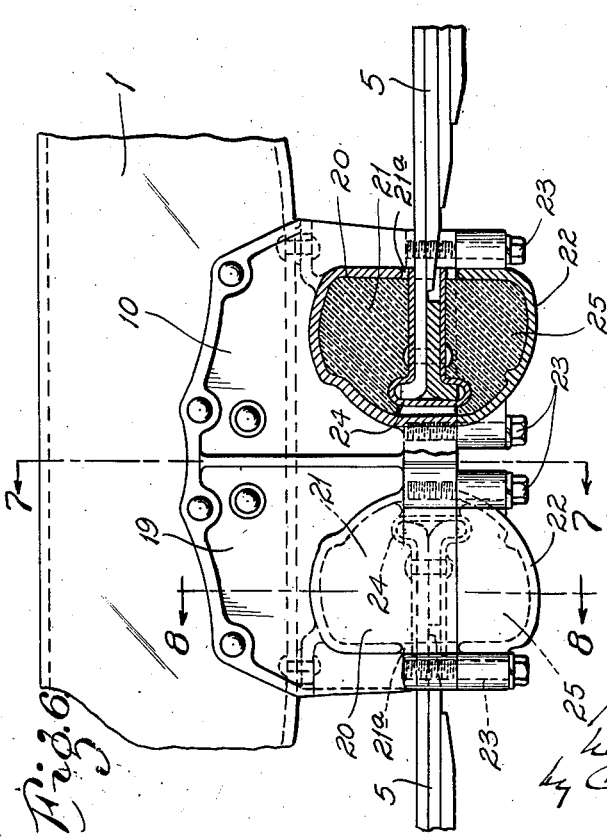

1,803,584

UNITED STATES PATENT OFFICE

HERBERT W. ALDEN AND NELSON R. BROWNYER, OF DETROIT, MICHIGAN, ASSIGNORS TO THE TIMKEN-DETROIT AXLE COMPANY, OF DETROIT, MICHIGAN, A CORPORATION OF OHIO

CAR TRUCK

Application filed December 5, 1927. Serial No. 237,720.

This invention relates to trucks, especially street car trucks. Some of its principal objects are to minimize jarring and jolting, and to deaden noise. It consists principally in providing the truck with underslung springs as hereinafter described and claimed. It also consists in the parts and arrangements of parts hereinafter described and claimed.

In the accompanying drawing, which forms part of this specification and wherein like numerals refer to like parts wherever they occur, Fig. 1 is a plan view of the truck conforming to our invention, Fig. 2 is a vertical view, being a longitudinal section on the line 2—2 of Fig. 1 and showing most of the parts in elevation, Fig. 3 is a detail vertical sectional view illustrating the support for the outer end of a truck spring, Fig. 4 is an end view of an end spring support, Fig. 5 is a detail cross section on the line 5—5 of Fig. 3, showing the relation of the end fitting to the side fitting; and Figs. 6, 7 and 8 are detail views illustrating the mounting of the inner ends of the truck springs, Fig. 6 being a partly side elevation and partly longitudinal section, Fig. 7 being the cross section on the line 7—7 of Fig. 6, and Fig. 8 being a cross section on the line 8—8 of Fig. 6.

The present truck comprises side frames 1 rigidly connected together about midway of their length by a bolster 2 and at their ends by end members 3. It also comprises axle housings 4, springs 5 for holding said axle housings in proper relation to the truck frame, and a live axle 6 in each housing together with rail wheels 7 fixed on each axle.

Each truck side frame 1 is preferably made in a single piece, either as a casting or preferably of pressed steel. In the design illustrated in the drawing, the middle portion of the side frame 1 is of maximum depth midway of its length and decreases towards each end, being flanged at both top and bottom throughout its length to increase its strength. Throughout its middle portion, the top of the side frame is below the top of the wheel and thus affords ample space for deep truck and body bolsters. The bottom of the middle portion of the side frame is close to the line that joins the center lines of the axles. From this middle portion, the truck side frame inclines upwardly to a maximum height above the axle and thence beyond and downwardly below the level of the axle at each end of said frame. Each end of the side frames 1 is provided with a fitting 8 or is otherwise adapted to receive the outer ends of the supporting springs 5; a middle portion of each side frame is provided with a fitting 10 that is rigidly secured thereto and depends therefrom and is adapted to receive the inner ends of the supporting springs 5. These springs 5 are leaf-springs of common type and are shackled against the bottom of the axle housing.

Each leaf-spring 5 is about half the length of the side frame and has one end mounted at one end of the side frame and the other end mounted near the middle of the side frame. The fittings 8 at the ends of the side frame have a shank portion 11 of substantially the same cross section as the end portion of the side frame against which they fit and to which they are riveted or otherwise rigidly secured. The projecting portions of these end fittings are in the form of housings or chambers 12 that open downwardly to form a hollow chamber that is closed by a cap or closure plate 13 secured to the bottom of said fitting by cap screws 14 or like devices. In the interior of the top of the housing or chamber and also on the interior of the closure cap forming the bottom of said chamber are transversely extending ribs 15 spaced from the front and back walls of said housing. Blocks 16 of rubber or other suitable resilient material are mounted between these ribs on the upper and lower sides of the leaf spring, which projects into said housing through an opening 17 provided therefor in the inner wall thereof, that is, in the back wall of the front housing and the front wall of the back housing. The end of the leaf spring has riveted or otherwise secured thereto a member 18 that is I-shaped in section and of such size that the rubber blocks will lie between and bear against the flanges thereof.

The fitting 10 at the middle of the side frame is illustrated in detail in Figs. 6, 7 and 8 of the drawings. The upper portion of this fitting is of angular shape with a vertical portion 19 that is riveted or otherwise secured to the side frame and with an inwardly projecting lower portion that extends under the side frame. This fitting is provided with two chambers 20 adapted to receive rubber blocks 21 that support the inner ends of the front and rear springs respectively. Each of these chambers is in the form of a housing open at the bottom and with an opening 21a in its outer wall adapted to receive the end of the spring. The bottom opening is covered by a cap or closure plate 22 secured by cap screws 23 or the like. The end of the spring has a member 24 riveted thereto whose end is enlarged around the bent end of the spring, thus forming a large bearing surface. In each chamber is a block 25 of rubber, preferably a single piece, with a recess in its middle to receive the end of the leaf spring but otherwise filling the recess in the housing and being placed under compression by the pressure of the screws that hold the closure plate.

In the case of the end fittings, the blocks of rubber are wholly above and below the spring and do not reach the end walls of the chamber; and in consequence of this arrangement, the adjacent ends of the springs are free to move endwise to a limited extent in said fittings, thereby permitting the axle housings to roll or rock in accommodating themselves to torsional stresses due to stopping and starting of the car. In the case of the housings at the middle of the side frames, however, the recesses are completely filled with the rubber, and the leaf springs have very little or no capacity for moving endwise therein. The principal reason for this difference is to better enable the truck to ride over obstructions without materially deflecting the axle from its proper position at right angles to the track, to maintain a proper spacing of the two axle housings with relation to each other.

As this truck is especially designed for an underhung worm drive wherein the propeller shaft makes an angle with the ground, it is advantageous to mount the axle housing with its bottom tilted at substantially the same angle to the ground as that made by the propeller shaft, as this arrangement makes it feasible to use with an underhung worm drive the same axle housing of polygonal section that can be used with other types of drives. With pressed-steel axle housings, this arrangement is effected by means of a saddle plate or block 26 which is mounted on the top of the axle housing with its bottom inclined to rest flatwise against the inclined top of an axle housing and with depending shoulders that fit against the sides of the housing and with its ends prolonged and formed with vertical perforations therethrough for clamping bolts 27. The top of this saddle block is recessed to receive a block 28 of wood or other soft material suitable for receiving and deadening the impact of the side frame thereon. Another saddle block 29 with side flanges is seated on the top of the leaf spring and has its top surface inclined and shouldered to fit against the bottom and sides of the housing. Its ends are also extended and provided with vertical perforations to receive said locking bolts. With housings of cast metal, the plates 26 and 29 may be dispensed with and lugs cast on the housing in lieu of said plates. A third saddle block 30 fits under the spring and is perforated to receive said bolts. Nuts 31 are threaded on the lower threaded ends of said bolts and serve to clamp the several parts firmly together. It is noted that the inclination of the bottom of the housing is upwardly from the end of the side frame toward the middle thereof.

What we claim is:

1. A street car truck comprising side frames, straight leaf springs, axle housings against the bottom of which the middle portions of said springs are secured, said side frames having at their middle and ends hollow fittings that extend below the axle housings and contain blocks of rubber or the like that are adapted to receive the ends of said springs, the middle fittings each containing two chambers and the blocks in said chambers forming abutments for the adjacent ends of said springs and the blocks in the end fittings being above and below the springs and having space opposite the ends of said springs to permit endwise play of the adjacent ends of said springs.

2. A street car truck comprising side frames, substantially horizontal leaf springs of about one-half the length of said side frames whose inner ends are supported from the middle portion of the side frames and whose outer ends are movably supported at the ends of said side frames, axle housings and means for securing the middle portions of said springs against the bottoms of said housings, said means comprising a saddle block fitting against the top of a housing and having an impact block in the top thereof adapted to deaden the impact of the side frame, a second saddle block fitting against the bottom of the housing and straddling the spring and a third block below the spring and means for clamping said blocks together.

3. A street car truck comprising side frames, a bolster rigidly secured thereto substantially horizontal leaf springs of about one-half the length of said side frames whose inner ends are supported from the middle portion of the side frames and whose outer ends are movably supported at the ends of said side frames, axle housings of polygonal cross section with the bottom surface inclined to the ground, and means for securing the middle portions of said springs against the bottoms of said housings, said means comprising a saddle block fitting against the top of a housing, a second saddle block fitting against the bottom of the housing and straddling the spring and a third block below the spring and means for clamping said blocks together.

4. A street car truck comprising axle housings having axles therein, side frames each having a spring supporting fitting mounted at its middle portion and extending below said axles and spring supporting fittings at its ends extending below said axles, approximately horizontal leaf springs of about half the length of said side frames, said springs having their adjacent ends supported in the middle fitting and their outer ends supported in said end fittings, and means for securing the middle portions of said springs against the bottoms of said housings, said means comprising a saddle block fitting against the top of a housing, a second saddle block fitting against the bottom of the housing and straddling the spring and a third block below the spring and means for clamping said blocks together.

Signed at Detroit, Michigan, this 29th day of November, 1927.

HERBERT W. ALDEN.
NELSON R. BROWNYER.